Patented Aug. 31, 1948

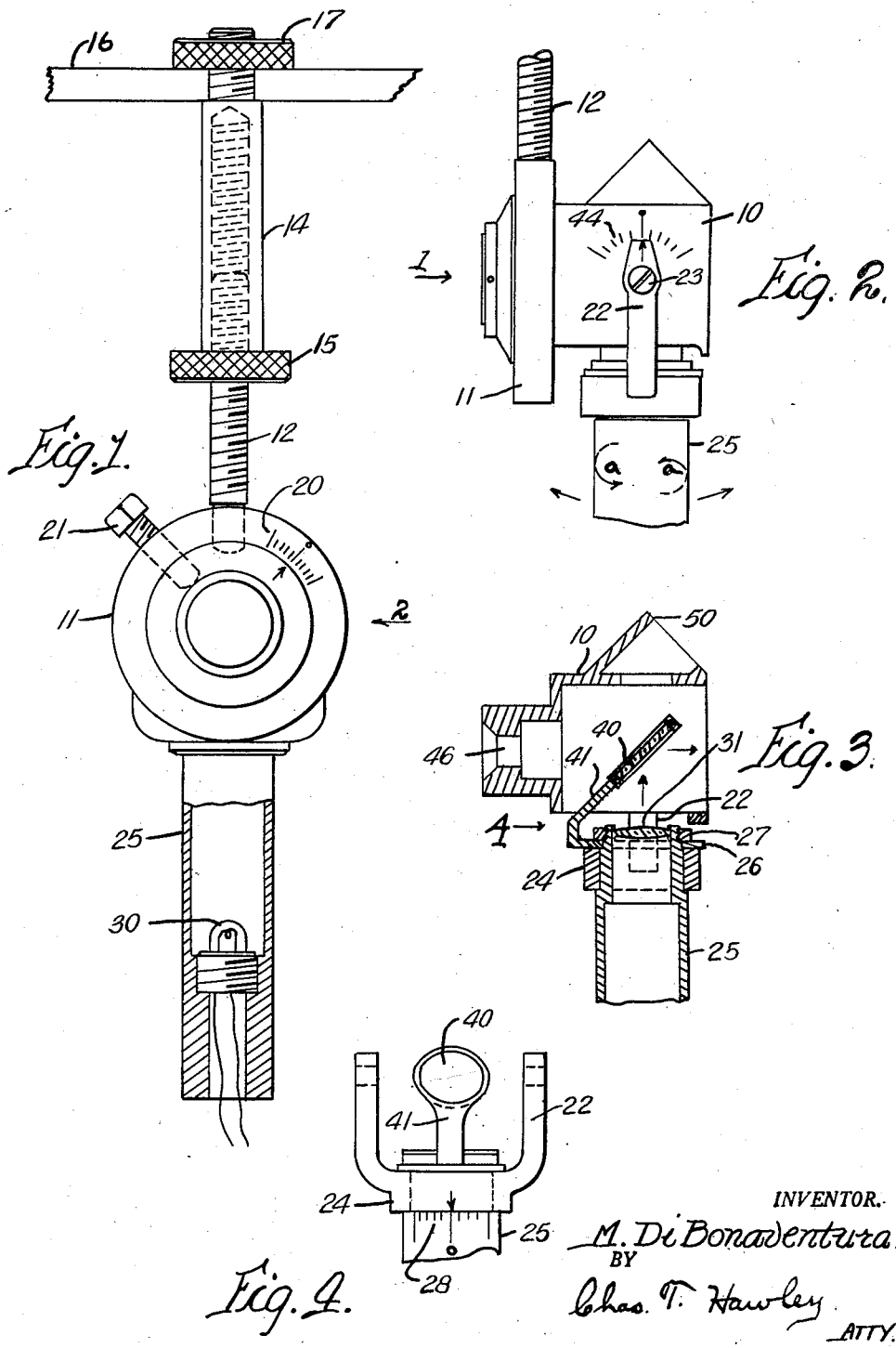

2,448,140

UNITED STATES PATENT OFFICE 2,448,140

RETINOSCOPE FOR DETERMINING REFRACTIVE ERRORS OF THE EYE

Marino Di Bonaventura, Southbridge, Mass.

Application August 9, 1946, Serial No. 689,499

2 Claims. (Cl. 88—20)

1

This invention relates to a retinoscope as used by oculists in determining refractive errors in the eye of a patient.

It is necessary to measure such errors in two directions which are perpendicular to each other and which correspond to the two principal meridians in the patient's eye which is under examination. These meridians, while perpendicular to each other, vary somewhat for different persons with respect to a horizontal plane.

The usual commercial retinoscope is held loosely in the operator's hand and is turned about manually in an effort to produce movements in perpendicular directions and at the observed angle of the eye meridians. Readings thus obtained depend very largely on the skill of the operator and at best are only approximately correct.

It is the general object of my invention to provide an improved retinoscope in which the reflecting mirror may be accurately adjusted about predetermined perpendicular axes and may also be secured in a desired angular position.

A further object is to provide a construction by which the mirror-adjusting movements along the eye meridians will be accurately perpendicular to each other and will be in the desired meridian planes. I further provide graduations by reference to which selected positions may be accurately recorded.

My invention further relates to arrangements and combinations of parts which will be hereinafter described and more particularly pointed out in the appended claims.

A preferred form of the invention is shown in the drawings, in which

Fig. 1 is a front elevation, partly in section, of my improved retinoscope;

Fig. 2 is a partial side elevation, looking in the direction of the arrow 2 in Fig. 1;

Fig. 3 is a view similar to Fig. 2 but with the parts shown in section; and

Fig. 4 is a detail view of certain parts, looking in the direction of the arrow 4 in Fig. 3.

Referring to the drawings, my improved retinoscope comprises a cylindrical body 10 mounted in an annular support 11 which in turn is provided with a supporting rod 12. The rod 12 is threaded in a stud 14 and may be secured in vertically adjusted position in said stud by a lock nut 15. By adjusting the rod 12 in the stud 14 the vertical position of the retinoscope may be varied.

The stud 14 has a transverse slot or opening to receive a square rod 16 which may form part of a commercial phoroptor. A clamping nut 17 provides means for securing the stud 14 firmly in a selected position along the fixed rod or support 16.

The angular position of the body 10 in the annular support 11 may be indicated on a graduated scale 20, and the retinoscope may be secured in adjusted angular position by a clamping screw 21. This position will be selected by the operator to correspond to the meridian planes of the eye under examination.

A yoke 22 is pivoted at 23 on the cylindrical body 10 and supports a bearing 24 for a tube 25. The tube 25 is held in the bearing 24 by a washer 26 and clamping nut 27, but may be freely turned manually in said bearing. A scale 28 (Fig. 4) may be provided to indicate the angular position of the tube 25.

A source of light such as a bulb 30 (Fig. 1) is provided in the lower end of the tube 25, and a condensing lens 31 is mounted at the upper end of the tube. A lightly silvered reflecting mirror 40 is mounted in an arm 41 which projects upward from the washer 26 and which is thus secured to the tube 25 and mounted to turn therewith. Consequently, as the tube 25 is turned in one direction or the other as indicated by the arrows $a$ in Fig. 2, the mirror 40 will also be turned about the axis of the tube 25.

The tube 25 and yoke 22 may also be swung about the yoke pivots 23 on an axis perpendicular to the axis of the tube 25. This swinging movement of the tube 25 may be indicated by a scale 44 on the side of the body 10.

The ray of light from the bulb 30 is reflected by the mirror 40 to the eye of the patient, and the results may be observed by the oculist who looks through the opening 46. Such observation is permitted by the very light reflecting coating on the mirror 40.

It will thus be apparent that my improved retinoscope may be supported on a fixed rod 16 in any selected horizontal or vertical position; that the cylindrical body may be angularly adjusted in the annular support 11 and may be secured in such angularly adjusted position, and that the mirror 40 may be swung about two different and perpendicular axes which are determined by the angular position of the body 10 in the support 11.

It will be further apparent that the selected angular positions of the body 10, the tube 25 and the mirror 40 may be recorded by reference to the graduated scales 20, 28 and 44 provided on the support 11, the tube 25 and the body 10.

The open projecting portion 50 in the upper part of the body 10 is provided as a light trap to prevent undesired reflections.

Having thus described my invention and the advantages thereof, I do not wish to be limited to the details herein disclosed, otherwise than as set forth in the claims, but what I claim is:

1. In a retinoscope, in combination, a fixed supporting means, a hollow cylindrical body having axially aligned viewing apertures in its end walls, said body being rotatably mounted in said supporting means and being angularly adjustable therein, means to secure said body in angularly adjusted position in said supporting means, a bearing member pivoted to said body and swingable about a diameter thereof, a tube rotatably mounted in said bearing member and having its axis of rotation perpendicular to said diameter and intersecting the same, a light source in the lower end of said tube, and a partially-transparent mirror mounted at the upper end of said tube and within said cylindrical body and at the intersection of the axes of said tube, body and bearing member, and said mirror being both angularly movable and swingable with said tube and being effective to reflect light rays from said light source through one of said viewing apertures to an eye to be tested, and the eye thus illuminated being clearly visible to an observer looking through both of said aligned viewing apertures and through the partially-transparent mirror interposed between said viewing apertures.

2. In a retinoscope, in combination, a hollow cylindrical body having axially viewing apertures in its end walls, fixed supporting means for said body, a bearing member pivoted to said body and swingable relative thereto, a tube rotatably mounted in said bearing member and having its axis of rotation perpendicular to the pivotal axis of said bearing member and intersecting the same, a light source in the lower end of said tube and a partially-transparent mirror mounted on the upper end of said tube and within said cylindrical body and at the intersection of the axes of said tube and body, and said mirror being both angularly movable and swingable with said tube and being effective to reflect light rays from said light source through one of said viewing apertures at one end of said body to an eye to be tested, and the eye thus illuminated being clearly visible to an observer looking through both of said aligned viewing apertures and through the partially-transparent mirror interposed between said viewing apertures.

MARINO DI BONAVENTURA.

REFERENCES CITED

The following references are of record in the file of this patent:

UNITED STATES PATENTS

| Number | Name | Date |
|---|---|---|
| 2,257,331 | Clarke | Sept. 30, 1941 |

FOREIGN PATENTS

| Number | Country | Date |
|---|---|---|
| 3,083 | Great Britain | Feb. 12, 1895 |